June 10, 1952 L. K. NEHER 2,599,933
SUPERREGENERATIVE MICROWAVE RECEIVER
Filed Nov. 5, 1945
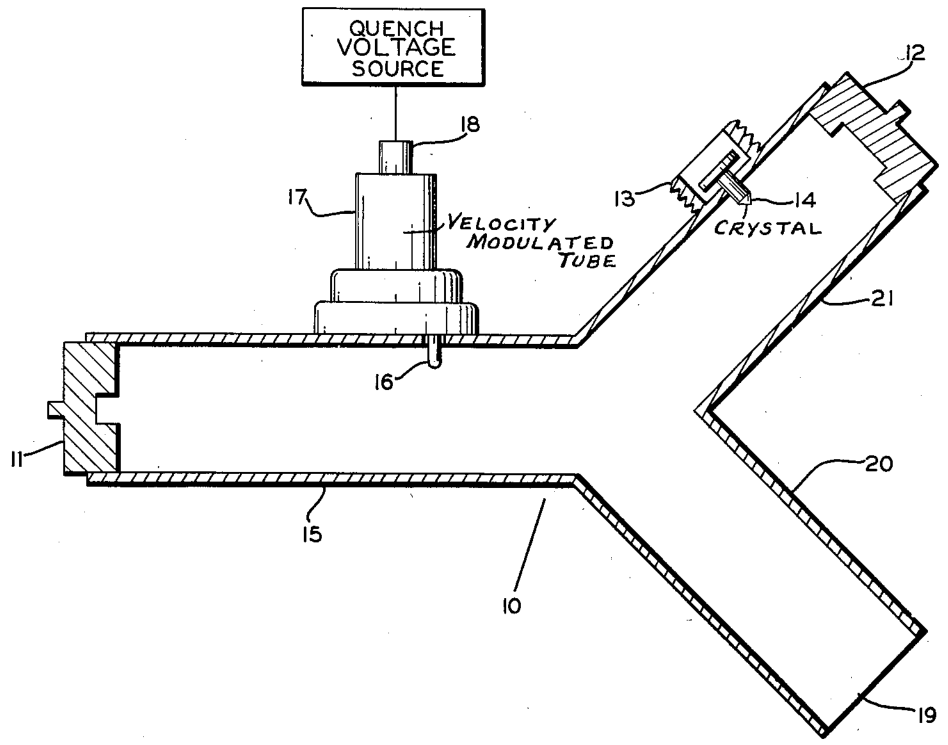
INVENTOR
LELAND K. NEHER
BY Ralph L Chappell
ATTORNEY Patented June 10, 1952 2,599,933

UNITED STATES PATENT OFFICE 2,599,933

SUPERREGENERATIVE MICROWAVE RECEIVER

Leland K. Neher, Newton, Mass., assignor, by mesne assignments, to the United States of America as represented by the Secretary of the Navy Application November 5, 1945, Serial No. 626,849

9 Claims. (Cl. 250—20)

This invention relates to methods and apparatus for receiving microwave radio energy and more particularly, to methods and apparatus for detecting and amplifying microwave radio energy by means of a superregenerative radio receiver.

The conventional type superregenerative microwave radio receiver is usually bulky and quite complicated. A known type of such a receiver requires a suitable filter network to remove quench frequency voltages and a number of video amplification stages to obtain an output video signal of suitable amplitude. When the video signal is taken from across a resistor in the cathode circuit of the oscillator tube it is usually quite small and requires considerable amplification before a usable signal is obtained It is an object of my invention to provide a microwave radio receiver which is simple, compact, and sensitive to weak signals.

Other objects and advantages of this invention will be apparent from the following description and drawing, the single figure of which is a cross sectional view of an embodiment of my invention.

Referring to the drawing, the superregenerative microwave radio receiver comprises a Y section of wave guide 10 of conventional design, two adjustable tuning plugs 11 and 12, and a video output jack 13. Mounted in the base of video output jack 13 is a crystal 14. In section 15 of the wave guide is an exciter probe 16. Exciter probe 16 is an extension out of a velocity modulated electron discharge device 17. The terminal 18 is connected internally to the repeller plate of velocity modulated tube 17.

A microwave radio signal, either pulsed or continuous, to be detected and amplified enters the wave guide at 19 and passes through section 20 into section 15. In section 15, the microwave radio signal to be detected is coupled by exciter probe 16 into velocity modulated tube 17 which is set up as a superregenerative detector.

Applied to terminal 18 and thus to the repeller plate of velocity modulated tube 17 is a series of rectangular pulses of suitable amplitude, duration and recurrence rate so as to allow oscillations at a given frequency in velocity modulated tube 17 to build up toward a constant amplitude. The duration and amplitude of the rectangular pulse applied to terminal 18 is such that oscillations in velocity modulated tube 17 are quenched by the termination of the applied pulse before the tube reaches saturation. Saturation is determined by the characteristics of velocity modulated tube 17. Periodically, as determined by the nature of the signal to be detected, and the effective Q of the circuit, the rectangular pulse quench voltages are applied to terminal 18.

With no microwave radio signal present, the envelope of the oscillations in velocity modulated tube 17 rises at an exponential rate and the rise is a function of the circuit Q. Velocity modulated tube 17 is so adjusted that it oscillates at the frequency of the signal to be detected and amplified. When an incoming signal at 19 is present, it is coupled into the cavity of velocity modulated tube 17 by probe 16. The electric field set up in the resonant cavity of velocity modulated tube 17 by the incoming signal causes the rising part of the envelope of the oscillations of velocity modulated tube 17 to have a steeper slope and to begin at an earlier time. Therefore, the area under the envelope of oscillations is increased. Since velocity modulated tube 17 is quenched before oscillations reach tube saturation, velocity modulated tube 17 acts as a linear superregenerative detector and therefore amplifies the incoming signal.

The oscillations of velocity modulated tube 17 are coupled into wave guide section 15 by probe 16. These oscillations pass through wave guide section 15 into wave guide section 21 and on to crystal 14. Crystal 14 rectifies these oscillations and the output of crystal 14, available at video output jack 13, is a pulsed D. C. signal.

When an incoming signal is present, the D. C. signal taken from jack 13 has a greater area, and detection and amplification of any incoming signal is thus effected.

The video output from jack 13 may be connected to a suitable video amplifier to achieve further amplification as desired.

Tuning plugs 11 and 12 are of conventional design to properly match probe 16 and crystal 14 to Y section wave guide 10 respectively.

While there has been described what is at present considered the preferred embodiment of the invention, it will be obvious to those skilled in the art that various changes and modifications may be made therein without departing from the scope of the appended claims.

What I claim is:

1. A superregenerative receiver comprising, a Y section wave guide, an oscillator, a crystal extending into a branch of said wave guide, means for coupling the output of said oscillator to a second section of said wave guide, means for causing the oscillator to produce oscillations, said oscillations rising towards saturation of said oscillator, means for discontinuing periodically said oscillations before saturation of said oscillator occurs, means for coupling an incoming signal by the third section of said wave guide to said oscillator to increase the rate of rise and to advance the starting time of said oscillations, said crystal rectifying said oscillations, whereby the change in said oscillations due to said signal will appear at the output of said crystal.

2. A superregenerative receiver comprising, a Y section wave guide, a velocity modulated tube, including a probe, said probe extending into a branch of said wave guide to couple said branch to the resonant cavity of said tube, a crystal extending into a second branch of said wave guide, means for applying a series of pulses to the repeller plate of said tube to allow said tube to oscillate, the oscillations during each pulse rising logarithmically towards tube saturation, means for applying signals to the third branch of said wave guide and thus, to said tube to increase the rate of rise and to advance the starting time of said oscillations said crystal rectifying said oscillations, whereby the change in said oscillations due to said signals will appear at the output of said crystal.

3. The combination of claim 2 with a tunable plunger at the open end of said first and second branches to match said probe and said crystal to the corresponding branches.

4. A microwave superregenerative amplifier comprising a hollow pipe wave-guide section, an oscillator coupled to said wave-guide section, a rectifier coupled to said wave-guide section, means for matching said rectifier and said oscillator to said wave guide, means for causing oscillations of said oscillator to be quenched, means for coupling an incoming signal to said wave-guide section and means coupling a signal derived from said incoming signal from said rectifier means.

5. A superregenerative amplifier comprising a wave guide, a velocity modulated oscillator, means coupling the resonant element of said oscillator to said wave guide, means for causing the oscillations of said oscillator to be quenched, a crystal rectifier coupled to said wave guide, means for coupling an input signal to said wave guide, and output means coupled to said rectifier for receiving a signal derived from said incoming signal.

6. A superregenerative receiver comprising, first, second and third wave guide sections, said three sections meeting in a common junction, a detector coupled to said first wave guide section, an oscillator coupled to said second wave guide section, means for causing oscillations of said oscillator to be periodically quenched, means for coupling an incoming signal to said third wave guide section, said incoming signal causing a change in the rise of oscillations generated by said oscillator, and means for coupling an output signal from said detector.

7. A superregenerative receiver comprising, first, second and third wave guide sections, said three sections meeting in a common junction, a detector coupled to said first wave guide section, an oscillator coupled to said second wave guide section to receive a control signal therefrom, the coupling of said oscillator to said second wave guide section being adapted to return the oscillations generated by said oscillator to said second wave guide section, means for causing said oscillator to produce oscillations which rise toward saturation of said oscillator and for periodically discontinuing said oscillations, means for coupling an incoming signal to said third wave guide section, said incoming signal thereby being coupled to said oscillator to alter the rise of said oscillations toward saturation, and means for coupling an output signal from said detector.

8. A superregenerative receiver comprising, a Y section wave guide formed of first, second and third wave guide sections meeting in a common junction, a detector coupled to said first wave guide section, an oscillator adapted to produce oscillations which rise toward saturation of said oscillator, means coupled to said oscillator for periodically quenching said oscillations at an amplitude less than saturation, means coupling said oscillator to said second wave guide section, said coupling means being adapted to couple a control signal from said second wave guide section to said oscillator and to return the oscillations generated by said oscillator to said second wave guide section, means for coupling an incoming signal to said third wave guide section, said incoming signal thereby being coupled to said oscillator to alter the rise of said oscillations toward saturation and means for coupling an output signal from said detector.

9. A superregenerative receiver comprising, first, second and third hollow pipe wave guide sections, said three sections meeting in a common junction, a crystal detector coupled to said first wave guide section, a velocity modulated oscillator adapted to produce oscillations which rise toward saturation of said oscillator, said oscillator including a cavity resonator, means coupled to said oscillator for periodically quenching said oscillations at an amplitude less than saturation, coupling means coupled to said cavity resonator and to said second wave guide section, said coupling means being adapted to couple a control signal from said second wave guide section to said cavity resonator and to return the oscillations generated by said oscillator to said second wave guide section, means for coupling an incoming signal to said third wave guide section, said incoming signal thereby being coupled to said oscillator to alter the rise of said oscillations toward saturation, and means for coupling an output signal from said detector.

LELAND K. NEHER.

REFERENCES CITED

The following references are of record in the file of this patent:

UNITED STATES PATENTS

| Number | Name | Date |
|---|---|---|
| 1,424,065 | Armstrong | July 25, 1922 |
| 2,190,511 | Cage | Feb. 13, 1940 |
| 2,190,515 | Hahn | Feb. 13, 1940 |
| 2,379,673 | Banks | July 3, 1945 |
| 2,406,370 | Hansen | Aug. 27, 1946 |
| 2,412,710 | Bradley | Dec. 17, 1946 |